(12) United States Patent
Sakai et al.

(10) Patent No.: US 10,511,807 B2
(45) Date of Patent: Dec. 17, 2019

(54) INFORMATION PROCESSING APPARATUS, INFORMATION PROCESSING METHOD, AND PROGRAM

(71) Applicant: Sony Corporation, Tokyo (JP)

(72) Inventors: Yusuke Sakai, Kanagawa (JP); Atsushi Izumihara, Kanagawa (JP); Daisuke Miki, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 15/778,721

(22) PCT Filed: Sep. 20, 2016

(86) PCT No.: PCT/JP2016/077745
§ 371 (c)(1),
(2) Date: May 24, 2018

(87) PCT Pub. No.: WO2017/098772
PCT Pub. Date: Jun. 15, 2017

(65) Prior Publication Data
US 2018/0352193 A1    Dec. 6, 2018

(30) Foreign Application Priority Data
Dec. 11, 2015  (JP) .................................. 2015-242438

(51) Int. Cl.
*H04N 7/14* (2006.01)
*H04N 7/15* (2006.01)
(Continued)

(52) U.S. Cl.
CPC .......... *H04N 7/15* (2013.01); *G10L 21/0324* (2013.01); *H04M 11/00* (2013.01); *H04N 7/157* (2013.01); *H04R 3/00* (2013.01); *H04S 7/303* (2013.01)

(58) Field of Classification Search
CPC ...... G10L 21/0324; H04M 11/00; H04N 7/15; H04N 7/157; H04R 3/00; H04S 7/303
(Continued)

(56) References Cited

U.S. PATENT DOCUMENTS 7,489,788 B2 * 2/2009 Leung ................... H04R 5/027
381/92
9,338,579 B2 * 5/2016 Haack ....................... H04S 7/40
(Continued)

FOREIGN PATENT DOCUMENTS

JP         200456161 A    2/2004
JP         2006254166 A   9/2006
(Continued)

OTHER PUBLICATIONS

International Search Report corresponding to PCT/JP2016/077745, dated Dec. 27, 2016 (2 pgs.).

*Primary Examiner* — Khai N. Nguyen
(74) *Attorney, Agent, or Firm* — Lerner, David, Littenberg, Krumholz & Mentlik, LLP

(57) ABSTRACT

To provide an information processing apparatus, an information processing method, and a program capable of aurally producing distance in a virtual three-dimensional space by using the space for a connection to a communication partner, and realizing more comfortable communication. An information processing apparatus including: a reception unit configured to receive data from a communication destination; and a reproduction control unit configured to perform control such that sound data of a space of the communication destination is reproduced from a sound output unit in a space of a communication source with an output value in accordance with separation distance between the communication destination and the communication source disposed in a virtual three-dimensional space, the output value being different for each sound source type.

10 Claims, 14 Drawing Sheets

(51) Int. Cl.
*H04M 11/00* (2006.01)
*H04R 3/00* (2006.01)
*G10L 21/0324* (2013.01)
*H04S 7/00* (2006.01)

(58) Field of Classification Search
USPC .................................................. 348/14.08
See application file for complete search history.

(56) References Cited

U.S. PATENT DOCUMENTS

| | | | |
|---|---|---|---|
| 2004/0169581 A1* | 9/2004 | Petrovic | G10L 19/018 340/5.2 |
| 2005/0080616 A1* | 4/2005 | Leung | H04R 5/027 704/200.1 |
| 2006/0206560 A1 | 9/2006 | Kanada | |
| 2008/0062252 A1 | 3/2008 | Kawamura et al. | |
| 2010/0145701 A1* | 6/2010 | Kaneko | A63F 13/10 704/258 |
| 2014/0119581 A1* | 5/2014 | Tsingos | H04S 3/008 381/300 |
| 2016/0007133 A1* | 1/2016 | Mateos Sole | H04S 3/008 381/18 |
| 2018/0332421 A1* | 11/2018 | Torres | H04S 3/008 |
| 2018/0352193 A1* | 12/2018 | Sakai | H04M 11/00 |

FOREIGN PATENT DOCUMENTS

| | | |
|---|---|---|
| JP | 2006343447 A | 12/2006 |
| JP | 200867203 A | 3/2008 |
| JP | 2009049558 A | 3/2009 |
| JP | 4645355 B2 | 3/2011 |
| JP | 5707824 B2 | 4/2015 |

* cited by examiner

TO 400c

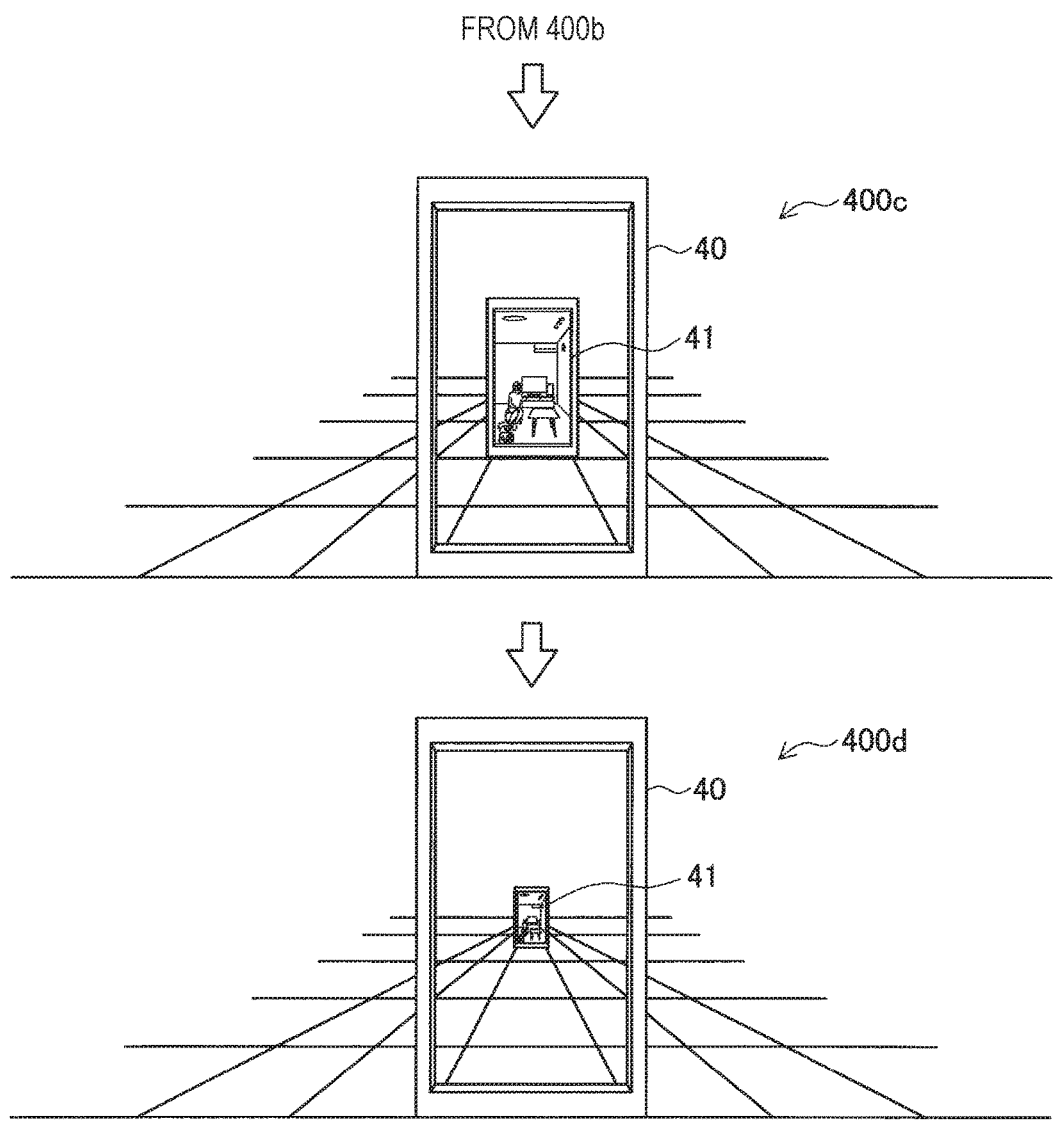

FIG. 4

[USER ELEMENT] × [ENVIRONMENT ELEMENT] = [CONNECTION REQUEST LEVEL]  ⋯ FORMULA 1

$$\begin{pmatrix} \text{MOTHER} \\ \text{WASHING FACE} \\ \text{WISH TO CHECK} \\ \text{CONDITION} \end{pmatrix} \begin{pmatrix} \text{NOISY} \\ \text{BEFORE} \\ \text{CLEANING} \\ \text{SUNNY} \end{pmatrix} \begin{pmatrix} \text{INTERVAL} \quad 35/100 \\ \text{CLEARNESS} \quad 20/100 \end{pmatrix}$$

FIG. 5

[CONNECTION REQUEST LEVEL OF USER A]
(INTERVAL 35/100
CLEARNESS 20/100)

×

[CONNECTION REQUEST LEVEL OF USER B]
(INTERVAL 65/100
CLEARNESS 80/100)

=

[OPTIMUM CONNECTION DEGREE]
(INTERVAL 35/100
CLEARNESS 50/100)

... FORMULA 2

INFORMATION PROCESSING APPARATUS, INFORMATION PROCESSING METHOD, AND PROGRAM

CROSS-REFERENCE TO RELATED APPLICATIONS

This application is a national phase entry under 35 U.S.C. § 371 of International Application No. PCT/JP2016/077745 filed Sep. 20, 2016, which claims the priority from Japanese Patent Application No. 2015-242438 filed in the Japanese Patent Office on Dec. 11, 2015, the entire contents of which are hereby incorporated by reference.

TECHNICAL FIELD

The present disclosure relates to an information processing apparatus, an information processing method, and a program.

BACKGROUND ART

In recent years, there has been proposed a video conference system that uses the development of communication technologies to allow for conversations between two places in which a plurality of participants are present. Specifically, for example, there are provided a display apparatus, a camera, an MIC, and a speaker in each place. Video and sound data that are respectively captured and picked up in one of the places are output in real time from the display apparatus and speaker installed in the other place.

Regarding such a bi-directional communication technology, for example, Patent Literature 1 below proposes a system capable of preventing an invasion of a user's privacy, and allowing content indicated by content data to be selectively shared when content is shared and conversations are carried out with a communication partner.

In addition, Patent Literature 2 below proposes that it be possible to determine the degree of a request for communication between a user and a communication partner on the basis of state information of the user, and perform comfortable communication that is not inconvenient for each other. With this arrangement, it is possible to prevent the user from receiving an inconvenient call such as a call made by the partner missing the state information, and a compulsory call made by the partner.

CITATION LIST

Patent Literature

Patent Literature 1: JP 5707824B
Patent Literature 2: JP 4645355B

DISCLOSURE OF INVENTION

Technical Problem

However, in Patent Literature 1 described above, it is possible to selectively share content with a communication partner, but nothing is taken into consideration regarding the distance between spaces such as the distance or interval to the communication partner.

In addition, Patent Literature 2 described above takes proper measures against the timing (i.e., call timing) for connecting spaces, but does not also mention anything about the distance between spaces.

Then, the present disclosure proposes an information processing apparatus, a control method, and a program capable of aurally producing distance in a virtual three-dimensional space by using the space for a connection to a communication partner, and realizing more comfortable communication.

Solution to Problem

According to the present disclosure, there is proposed an information processing apparatus including: a reception unit configured to receive data from a communication destination; and a reproduction control unit configured to perform control such that sound data of a space of the communication destination is reproduced from a sound output unit in a space of a communication source with an output value in accordance with separation distance between the communication destination and the communication source disposed in a virtual three-dimensional space, the output value being different for each sound source type.

According to the present disclosure, there is proposed an information processing method including, by a processor: receiving data from a communication destination; and performing control such that sound data of a space of the communication destination is reproduced from a sound output unit in a space of a communication source with an output value in accordance with separation distance between the communication destination and the communication source disposed in a virtual three-dimensional space, the output value being different for each sound source type.

According to the present disclosure, there is proposed a program for causing a computer to function as: a reception unit configured to receive data from a communication destination; and a reproduction control unit configured to perform control such that sound data of a space of the communication destination is reproduced from a sound output unit in a space of a communication source with an output value in accordance with separation distance between the communication destination and the communication source disposed in a virtual three-dimensional space, the output value being different for each sound source type.

Advantageous Effects of Invention

As described above, according to the present disclosure, it is possible to aurally produce distance in a virtual three-dimensional space by using the space for a connection to a communication partner, and realize more comfortable communication.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 3B is a diagram that describes the distance between the spaces in the three-dimensional space according to the present embodiment.

FIG. 4 is a diagram illustrating an example of a calculation formula of a user's connection request level according to the present embodiment.

FIG. 5 is a diagram illustrating an example of a calculation formula of an optimum connection degree according to the present embodiment.

MODE(S) FOR CARRYING OUT THE INVENTION

Figure 1:
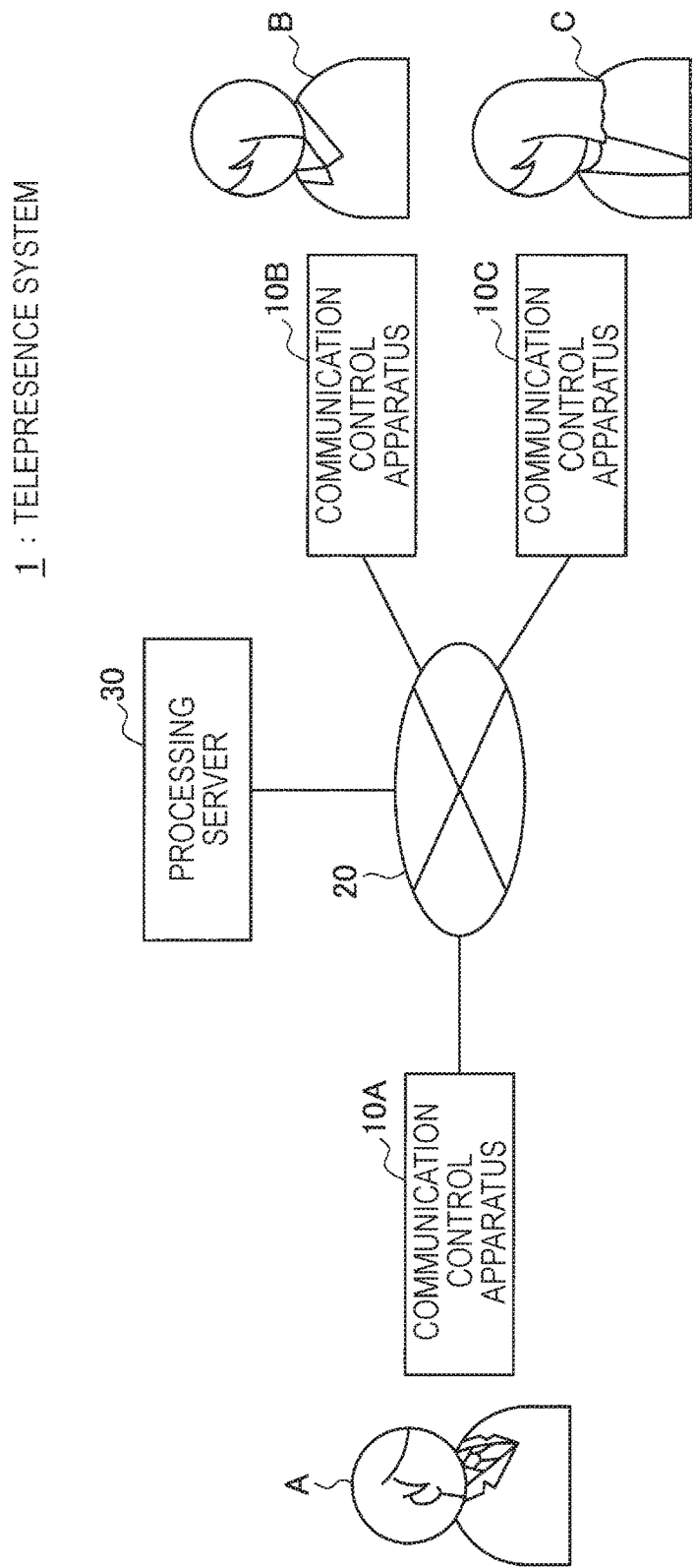
FIG. 1 is a diagram illustrating an overview of a telepresence system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, description will be made in the following order.
1. Overview of Information Processing Apparatus according to Embodiment of the Present Disclosure
2. Configuration of Communication Control Apparatus
3. Output Example of Space Information
4. Operation Processing
4-1. Communication Control Processing
4-2. Sound Source Separation Processing
4-3. Sound Source Reproduction Processing
5. Conclusion

1. Overview of Information Processing Apparatus According to Embodiment of the Present Disclosure The overview of a telepresence system 1 according to an embodiment of the present disclosure will be described with reference to FIG. 1. The telepresence system 1 according to the present embodiment connects spaces that are apart from each other by using video/sound/other information channels, and makes it possible to feel as if the places were connected and a partner existed. For example, when parents live apart from a child, the telepresence system 1 according to the present embodiment makes it possible to make their living-room spaces appear to be connected via a window or a door. Once their living-room spaces are connected, a user is able to lead a life roughly grasping the condition of the partner space (such as the condition of the child or the condition of the parents).

Here, the general video chat technology is capable of switching 0 and 1 such as displaying/not displaying video or turning sound on/off (mute) when performing remote communication through video sound channels, but incapable of finely adjusting the connection degree. Therefore, the general video chat technology fails to meet the needs of a user that the user does not wish to constantly connect to a partner with a realistic sense of presence, but wishes to feel the condition of the partner. In addition, it is necessary for a user to manually switch connection states. It also prevents increase in usage frequency from the perspective of operation cost.

In addition, as the case where a telepresence communication apparatus is capable of gradually adjusting the connection degree, it is conceivable, for example, to perform two-dimensional planar filter processing such as blur processing (blurring) or mask processing (blocking) on the living-room video of a partner. However, it is impossible to express the sense of distance such as depth or direction in terms of audio.

Then, in the present embodiment, a virtual three-dimensional space is used to connect spaces, and control the distance between the connected spaces, thereby making it possible to realize more comfortable communication and provide a pleasant connection degree for a user. It is possible to aurally produce the distance between spaces by reproducing audio spaces like three-dimensional spaces. The telepresence system 1 according to the present embodiment disposes and reproduces sound data in virtual three-dimensional space coordinates for each sound source type, or reproduces sound data associated with spaces, thereby enabling the "interval" (which is herein also referred to as "distance") between the space on a user side and the space on a partner side to be aurally felt. For example, as the living-room space on a partner side comes closer in a virtual three-dimensional space, a minute noise or the partner user's voice in the room on the other side is audible, and it is then possible to carry out natural conversations. In contrast, as the living-room space on the partner side gets farther, the sound volume of noise or voice becomes lower. Instead, the sound volume of given sound data becomes higher as the environment sound of the space (which is herein referred to as "courtyard space") between the user side and the living-room space on the partner side. This allows the user to feel a pleasant aural interval.

In addition, it is also possible to make the distance between spaces visually felt. For example, an image showing that the video of a communication destination (here, video of a living-room space) is disposed in a virtual three-dimensional space is displayed, thereby making it possible to make a user feel as if the partner were a given distance away.

In addition, the distance between spaces is automatically and continuously optimized in accordance with a user state or the like, thereby making it possible to reduce the load of a user operation.

The telepresence system 1 according to the present embodiment like this includes, as illustrated in FIG. 1, communication control apparatuses 10A, 10B, and 10C, and a processing server 30. These are connected to each other via a network 20.

The communication control apparatuses 10A, 10B, and 10C each include an input unit. The communication control apparatuses 10A, 10B, and 10C respectively acquire information of the spaces in which a user A, a user B, and a user C are present, and transmit the information to another communication control apparatus 10 or the processing server 30. In addition, the communication control apparatuses 10A, 10B, and 10C each include an output unit, and output information received from another communication control apparatus 10 or the processing server 30. Note that the example illustrated in FIG. 1 shows three communication control apparatuses 10, but the present embodiment is not limited thereto.

The processing server 30 performs synchronization processing for bi-directional communication between any two or more of the communication control apparatuses 10A to 10C, or performs computation/control or the like of separation distance based on the connection request levels from both. Note that the synchronization processing, or the computation/control or the like of separation distance may be performed in each of the communication control apparatuses 10A, 10B, and 10C, and the telepresence system 1 may be configured to dispense with the processing server 30.

2. Configuration of Communication Control Apparatus

Figure 2:
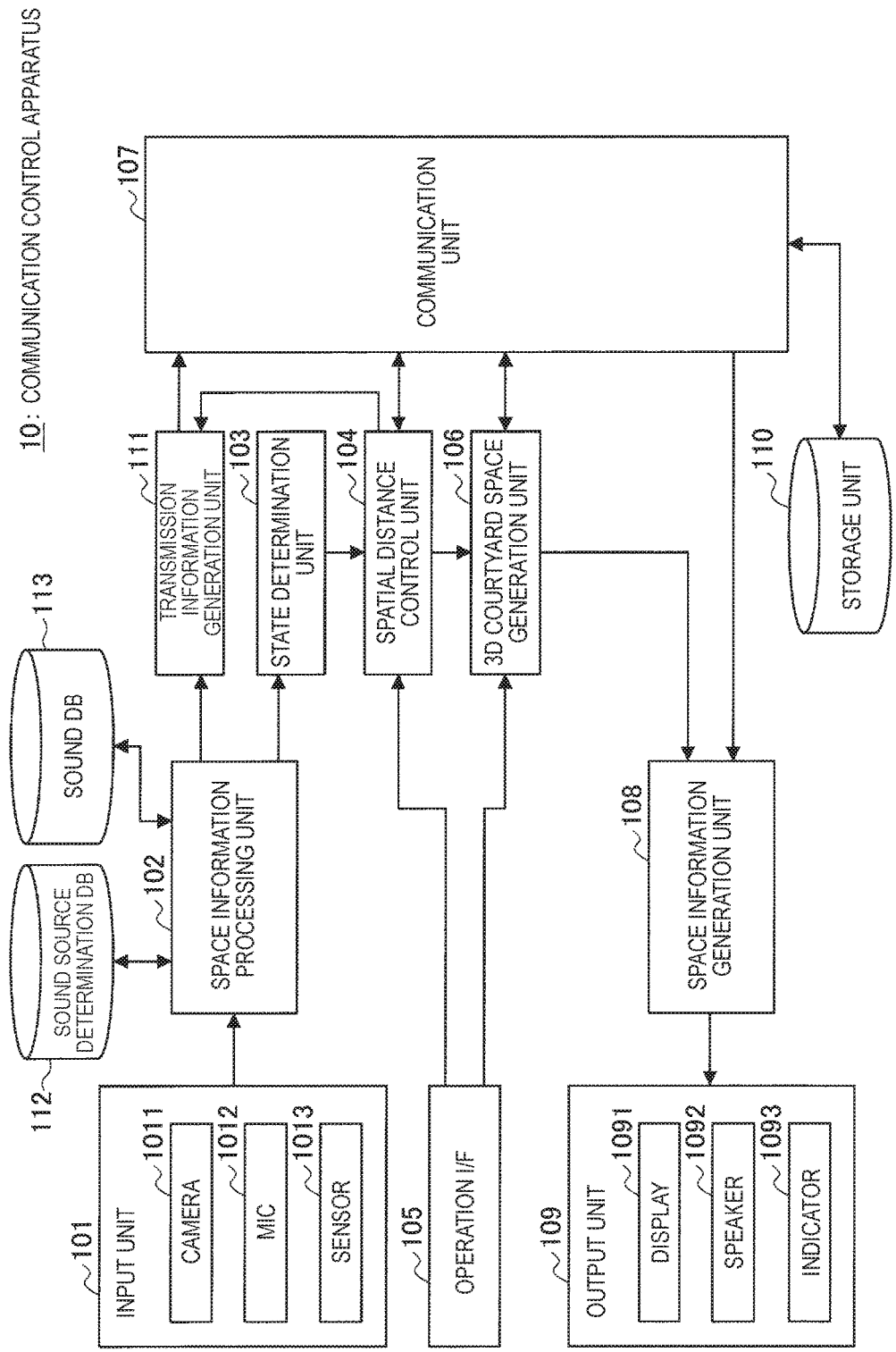
FIG. 2 is a block diagram illustrating an example of a configuration of a communication control apparatus according to the present embodiment.

Next, the configuration of a communication control apparatus 10 according to the present embodiment will be described with reference to FIG. 2. FIG. 2 is a block diagram illustrating an example of the configuration of the communication control apparatus 10 according to the present embodiment.

As illustrated in FIG. 2, the communication control apparatus 10 includes an input unit 101, a space information processing unit 102, a state determination unit 103, a spatial distance control unit 104, an operation interface (I/F) 105, a 3D courtyard space generation unit 106, a communication unit 107, a space information generation unit 108, an output unit 109, a storage unit 110, a transmission information generation unit 111, a sound source determination DB (database) 112, and a sound DB 113.

The input unit 101 has a function of receiving space information. For example, the input unit 101 is implemented by a camera 1011, an MIC (abbreviated from a microphone) 1012, and a sensor 1013. A plurality of cameras 1011 may also be included. The plurality of cameras 1011 image the inside of a space (e.g., living room), and acquire captured images. In addition, a plurality of MICs 1012 may be included. The plurality of MICs 1012 pick up the sound in a space, and the environment sound around the space (e.g., next room, corridor, outside of the house, or the like) to acquire sound data. In addition, the sensor 1013 has a function of sensing various kinds of information of the inside of a space or the area around the space. Examples of the sensor 1013 include a temperature sensor, a humidity sensor, an illuminance sensor, a motion sensor, a door opening and closing sensor, and the like.

The space information processing unit 102 acquires various kinds of space information from the input unit 101. The space information processing unit 102 prepares data such that the state determination unit 103 is capable of using the data as a material for state determination, and outputs the data. Preparing data refers to, for example, noise processing, image analysis, object recognition, sound analysis, or the like. Further, the space information processing unit 102 recognizes a user on the basis of the acquired space information. To recognize a user, it is assumed to identify the individual user in that space, or recognize the position (where the user is in the room, or the like), attitude (whether the user is standing, sitting, lying, or the like), emotion (whether the user is happy, sad, or the like), action (the user is cooking dinner, watching television, reading a book, or the like), busyness degree (whether or not the user is busying, or the like) of the user. In addition, the space information processing unit 102 recognizes an environment on the basis of the acquired space information. To recognize an environment, it is assumed to recognize the current time (morning, noon, evening, or midnight), brightness (brightness of the room, or light from a window), temperature, audio (sound picked up in the space), region (place where the space exists), in-order degree (to what extent the room is cleaned up), or the like of the space.

Sound analysis carried out by the space information processing unit 102 will be further described. The space information processing unit 102 according to the present embodiment performs sound source separation for reproducing an audio space (sound image), and creates a sound database by generating audio. For example, the space information processing unit 102 separates, for each sound source, sound data from sound data picked up by an MIC 1012 (e.g., array MIC) provided inside or outside a user side space (e.g., living-room space). Examples of the sound data for each sound source include uttered sound data of each user, footstep data, object sound data (sound of moving furniture, sound of a faucet, metallic sound of tableware, or the like) of each object, environment sound data (outdoor environment sound or the like), or the like. In addition, the space information processing unit 102 not only performs sound source separation, but also analyzes the sound source position (incoming direction or the like) of the separated sound data. A sound source determination can be made, for example, on the basis of the incoming direction of sound, distance, the frequency or characteristics of sound, sound data stored in the sound source determination DB 112, or a captured image taken by the camera 1011. In addition, the space information processing unit 102 stores the sound data subjected to the sound source separation in the sound DB 113 in association with the speaker or event to create a database. The sound data stored in the sound DB 113 is not limited to sound data acquired in real time, but may be sound data that is generated, for example, with an audio generation algorithm or the like. In addition, in the sound DB 113, indoor characteristic sound (e.g., sound of moving furniture, sound of an opening or closing front door, sound of stepping up or down stairs, chime of a clock, or the like) picked up by a gun MIC may be registered in advance.

The space information processing unit 102 outputs the sound data picked up by the MIC 1012, and the sound data subjected to the sound source separation to the transmission information generation unit 111 and the state determination unit 103. In addition, the space information processing unit 102 may replace the sound data picked up by the MIC 1012 with the sound data registered in the sound DB 113 in advance, and output the sound data to the transmission information generation unit 111 and the state determination unit 103. Further, the space information processing unit 102 may extract, from the sound DB 113, the sound data associated with an indoor event (e.g., ON/OFF operation or state change of an apparatus supporting IoT, stepping up or down stairs, opening or closing a door, or the like) sensed by the camera 1011, the MIC 1012, or the sensor 1013 or generate the sound data with a predetermined audio generation algorithm, and output the sound data to the transmission information generation unit 111 and the state determination unit 103.

The state determination unit 103 determines the state of a space or the state of a user (i.e., context of a space serving as a communication source) on the basis of the information acquired and output by the space information processing unit 102. For example, the state determination unit 103 determines the state of a space or the state of a user on the basis of a user recognition result and an environment recognition result of the space information processing unit 102. Note that the context of a space serving as a communication source can include the state of a user, the state of a real space where a user is present, time, a season, weather, a place, or the relationship with a partner user.

The spatial distance control unit 104 has a function of controlling the distance (depth separation distance) between connected spaces in a three-dimensional space. In the present embodiment, information acquired from the space of a communication destination is disposed with appropriate distance in a three-dimensional space to show depth for the connection. This realizes a pleasant connection state. Here, with reference to FIGS. 3A and 3B, the distance between spaces in a three-dimensional space according to the present embodiment will be described. In the examples illustrated in FIGS. 3A and 3B, the case will be described where a partner space image 41 is disposed with predetermined distance in the depth direction in a three-dimensional space on the basis of a window frame 40 displayed on a display 1091A of a communication source.

Figure 3A:
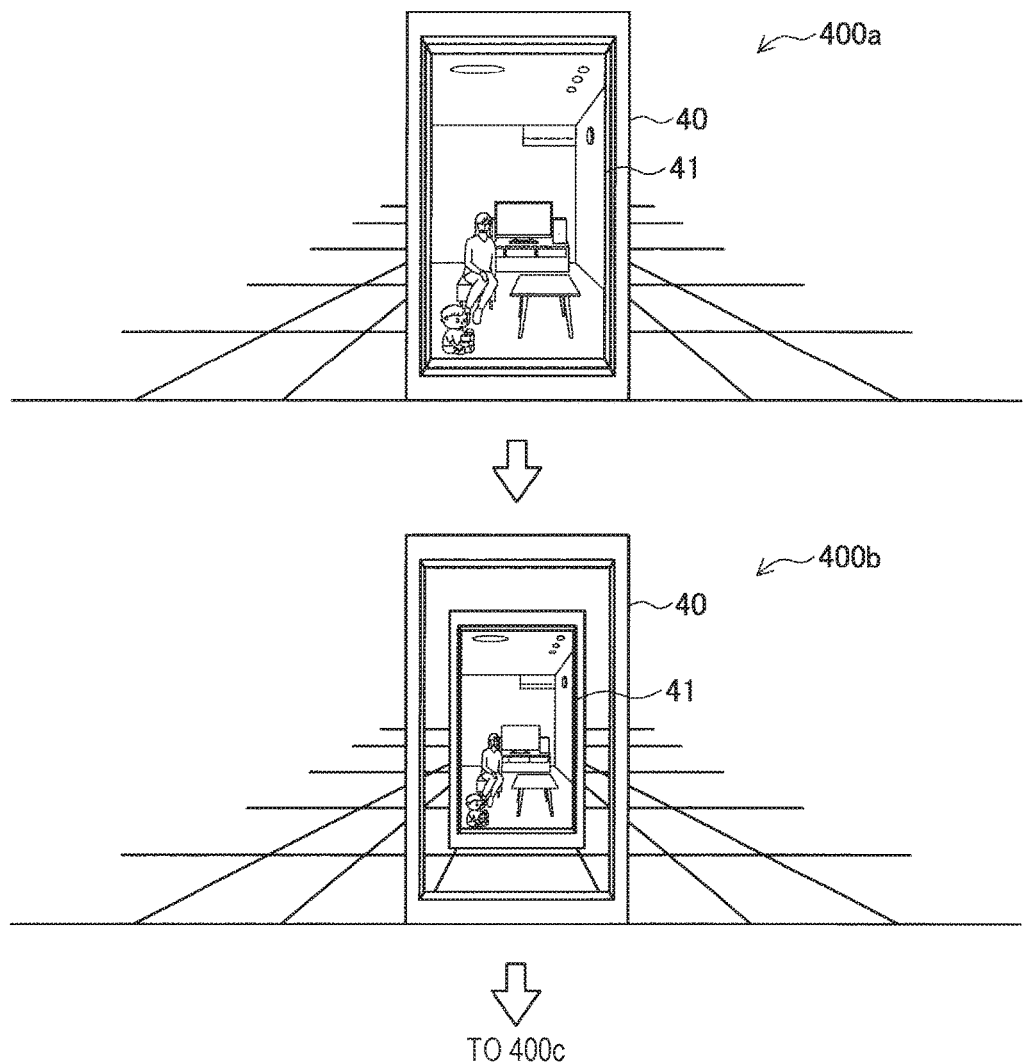
FIG. 3A is a diagram that describes distance between spaces in a three-dimensional space according to the present embodiment.

The upper part of FIG. 3A illustrates a disposition example 400a in which the partner space image 41 is disposed with a distance of 0 from the window frame 40 in a three-dimensional space. In this case, the partner space image 41 is displayed up to the window frame 40, and a user is able to feel the space of the partner right in front of the user via one window. The lower part of FIG. 3A illustrates a disposition example 400b in which the partner space image 41 is disposed with some distance from the window frame 40. In this case, the partner space image 41 is displayed with some distance from the window frame 40 in the depth direction. Since the space of the partner is positioned a little apart, a user feels less physical reluctance than the user does with a distance of zero. Next, the upper part of FIG. 3B illustrates a disposition example 400c in which the partner space image 41 is disposed with more distance. In this case, since the space of the partner is positioned apart, a user feels less psychological reluctance than the user does with the distance illustrated in the lower part of FIG. 3A. Next, the lower part of FIG. 3B illustrates a disposition example 400d in which the partner space image 41 is disposed with still more distance than in the disposition example 400c in the upper part of FIG. 3B. In this case, since the space of the partner is positioned more apart, a user feels less psychological reluctance than the user does with the distance illustrated in the upper part of FIG. 3B.

The distance to the partner space is adjusted, for example, on the basis of the connection request level of a user and the connection request level of a communication destination user. First, the connection request level of the user is calculated, for example, by the spatial distance control unit 104 on the basis of a determination result (context of the space of a communication source) output from the state determination unit 103. Here, FIG. 4 illustrates an example of the calculation formula of the connection request level of the user. As shown in a formula 1 of FIG. 4, a connection request level can be calculated by multiplying a user element (state of a user) by an environment element (state of a space). For example, in the case where a user is mother, and the state shows that the user is washing the face and wishes to check the condition of a communication destination space, and the space state shows that the inside of the space is noisy, the time is before cleaning, and it is sunny, the strength of the connection request level is calculated as a numeric value of 0 to 100. Note that it is also possible in the present embodiment to calculate an "interval" and "clearness" as the connection request level as illustrated in FIG. 4. That is, the "interval" means separation distance in a three-dimensional space. Outputting an "interval" to maintain appropriate distance to the connected partner makes it possible to realize a pleasant connection state. The "clearness" means the extent to which the video of a communication destination space is visible. In the present embodiment, blurring or blocking makes it possible to prevent the video of a partner from looking clear. The extent to which the video is visible is referred to as "clearness."

The connection request level of the communication destination user is transmitted from the communication control apparatus 10 serving as a communication destination via the communication unit 107.

Then, the spatial distance control unit 104 calculates an optimum connection degree on the basis of the calculated connection request level of the user and the received connection request level of the communication destination user. Here, FIG. 5 illustrates an example of the calculation formula of the optimum connection degree. As shown in a formula 2 of FIG. 5, for example, in the case where the connection degree of the user A and the user B is calculated, the connection request level of the user A is multiplied by the connection request level of the user B to calculate the optimum connection degree. In the present embodiment, as the optimum connection degree is stronger, the distance between spaces becomes shorter and the video looks clearer. Accordingly, a connection is made with a realistic sense of presence. As the optimum connection degree is lower, the distance between spaces becomes longer and the video looks less clear. Accordingly, a connection is made with a less realistic sense of presence. Note that the calculation formula is described here as an example with the "connection degree" considered to include both the "interval" and the "clearness." However, the present embodiment is not limited thereto. The calculation may be made with the "connection degree" considered to include the "interval" alone.

The operation interface (I/F) 105 receives an operation input from a user, and outputs the operation input to the spatial distance control unit 104 or the 3D courtyard space generation unit 106. This enables a user to optionally set, for example, the "connection request level of the user" or set a scene of a space which will be described next. In addition, operation inputs from a user for various objects disposed in a three-dimensional space are also possible.

The 3D courtyard space generation unit 106 refers to the 3D space between the video of the space of a communication destination which is disposed in a three-dimensional space in accordance with the distance to a communication partner which is set by the spatial distance control unit 104, and the foreground side that is the communication source user side as "3D courtyard space," and generates the space. In the "3D courtyard space," information from the communication source or the communication destination is reflected. In addition, it is also possible to dispose a designated object in the "3D courtyard space." This makes it possible to display a screen that seems to connect to the space of the communication partner through the virtual courtyard. In addition, reflecting the user state of the communication partner, the space state, surrounding information of the partner space, or the like in the courtyard space makes it possible to indirectly recognize the state of the partner.

The transmission information generation unit 111 is capable of adjusting the amount of data transmitted to a communication destination via the communication unit 107. In the present embodiment, the output value of sound data reproduced in a communication destination is controlled in accordance with the distance between a communication source and the communication destination in a three-dimensional space. Accordingly, for example, refraining from transmitting the sound data that is not reproduced in the communication destination makes it possible to reduce the communication cost, and protect the privacy of the user. Specifically, for example, in the case where the distance corresponding to the optimum connection degree set by the spatial distance control unit 104 is long, and the communication source is distant from the communication destination in a three-dimensional space, video displayed in the communication destination is small, and the indoor sound data is not reproduced. Accordingly, the transmission information generation unit 111 generates video of low resolution and outputs the video to the communication unit 107. The transmission information generation unit 111 stops outputting sound data to the communication unit 107.

In addition, in the case where a communication partner side has the sound data corresponding to an event in a space, the transmission information generation unit 111 is also capable of outputting only the data indicating the event to the communication unit 107 and causing the communication unit 107 to transmit the data to the communication destination.

The communication unit 107 connects to another communication control apparatus 10 and the processing server 30 via the network 20, and transmits and receives data. For example, the communication unit 107 transmits space information output from the space information processing unit 102, spatial distance output from the spatial distance control unit 104, and information of a 3D courtyard space output from the 3D courtyard space generation unit 106 to the communication control apparatus 10 serving as a communication destination or the processing server 30. In addition, the communication unit 107 receives the space information, the spatial distance, the information of a 3D courtyard space, and the like received from the communication control apparatus 10 serving as a communication destination or the processing server 30. In the present embodiment, a 3D courtyard space displayed in a communication source and a communication destination and distance in a three-dimensional space can be synchronized. In addition, the communication unit 107 is also capable of receiving information (weather information, news, schedule information, or the like) acquired by the processing server 30 from a relative service server on a network, or directly receiving the information from the relative service server on the network.

The space information generation unit 108 generates space information and sends the space information to the output unit 109 on the basis of a 3D courtyard space generated by the 3D courtyard space generation unit 106 and the video of the space of a communication destination which is received via the communication unit 107. For example, the space information generation unit 108 generates space image information obtained by combining the video of the space of a communication destination which is received via the communication unit 107 with the 3D courtyard space generated by the 3D courtyard space generation unit 106, and performs control such that the space image information is displayed on a display 1091.

In addition, the space information generation unit 108 generates space audio information for reproducing the audio space (sound image) corresponding to spatial distance, and performs control for reproduction by a speaker 1092. For example, the space information generation unit 108 sets the sound volume of the courtyard environment sound corresponding to the 3D courtyard space generated by the 3D courtyard space generation unit 106, and the indoor speech and the indoor noise in the space of a communication destination which is received via the communication unit 107 in accordance with distance D between a communication source space and a communication destination space in a three-dimensional space. Here, with reference to FIG. 6, sound volume control corresponding to the distance between the spaces in the three-dimensional space according to the present embodiment will be described.

Figure 6:
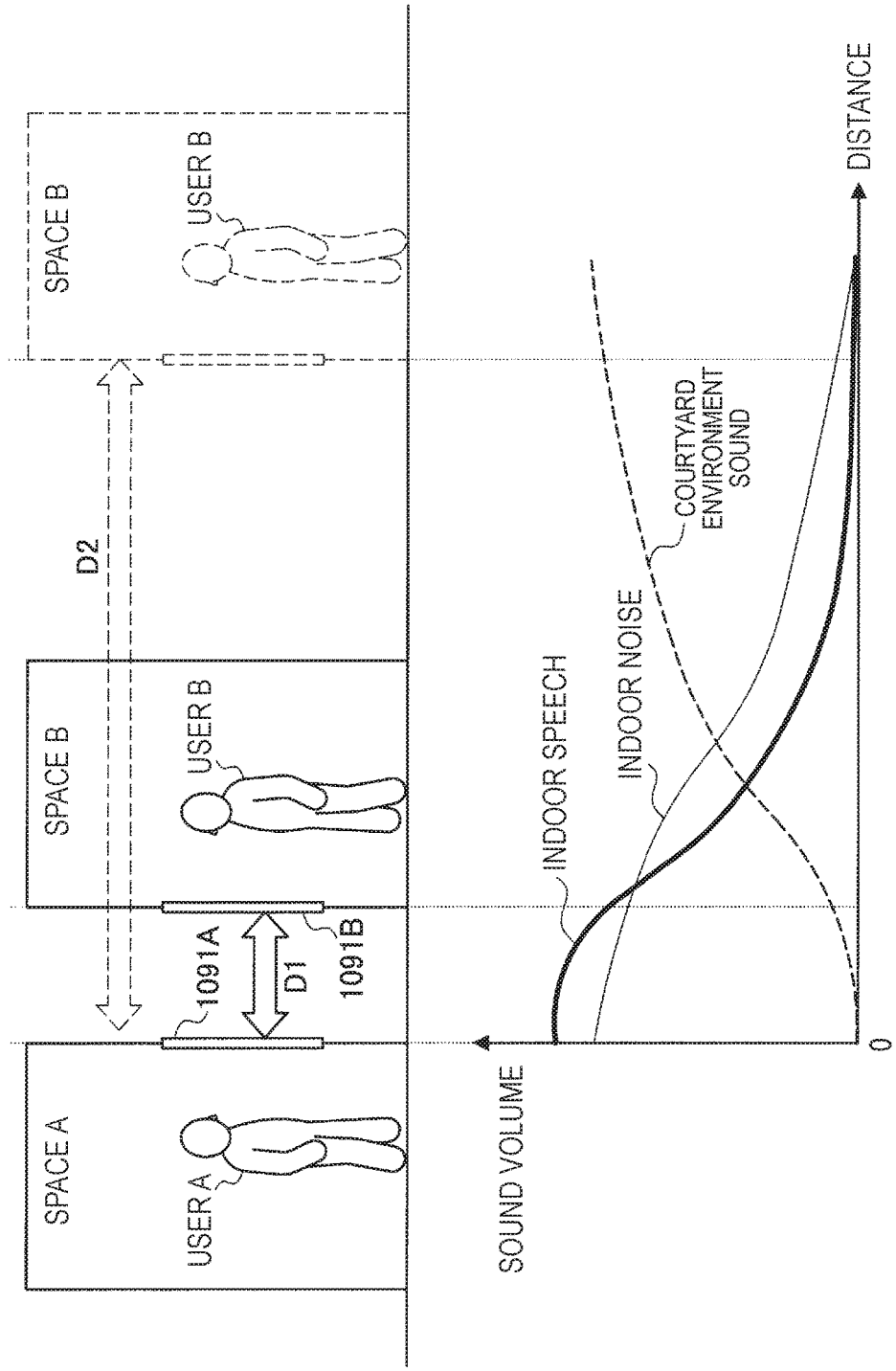
FIG. 6 is a diagram that describes sound volume control corresponding to the distance between the spaces in the three-dimensional space according to the present embodiment.

In the example illustrated in FIG. 6, in the case where the distance between a space A and a space B is D1, the sound volume of indoor speech and indoor noise is high, and the sound volume of courtyard environment sound is low. As the distance D is longer (greater), the sound volume of the indoor speech and the indoor noise becomes low, and the sound volume of the courtyard environment sound becomes high. In addition, in the case where the distance D is shorter (less), the sound volume of the indoor noise is lower than that of the indoor speech. However, as illustrated in FIG. 6, when the distance reaches a certain value, the sound volume of the indoor noise is higher than that of the indoor speech. The sound volume graph illustrated in FIG. 6 is an example. However, in the present embodiment, changing sound (sound volume) reproduced in accordance with distance in a virtual space in this way as three-dimensional-space-like audio processing makes it possible to make spatial distance aurally felt and realize a pleasant connection.

In addition, the space information generation unit 108 also performs sound image localization processing for sound data of each sound source, thereby making it possible to more efficiently reproduce a three-dimensional audio space.

The output unit 109 has a function of presenting the space information generated by the space information generation unit 108 to the user of a communication source. For example, the output unit 109 is implemented by the display 1091, the speaker 1092, or an indicator 1093.

Here, a configuration example of the speaker 1092 according to the present embodiment will be described. In the present embodiment, in reproducing an audio space, it is possible to present sound by virtual sound source localization technology or the like with a monaural, stereo, or 5.1ch-surround speaker configuration, or the like. In addition, the use of a wavefront synthesis speaker or the like that uses a speaker array makes it possible to accurately localize the sound image of the sound of the partner user or noise in the living-room space of the communication partner, and also reproduce environment sound from the entire reference plane (e.g., wall on which the display 1091 is installed) with plane waves.

In addition, in the present embodiment, a combination of a speaker implemented by a stereo speaker or the like and capable of localizing a sound image, and a flat speaker or the like capable of presenting plane sound that is not localized from the entire reference plane may be employed as the configuration.

The storage unit 110 storages data transmitted and received via the communication unit 107. In addition, in the example illustrated in FIG. 2, the communication unit 107 is connected, but the present embodiment is not limited thereto. The storage unit 110 can be used as a storage area of each component included in the communication control apparatus 10.

3. Output Example of Space Information

As described above, in the present embodiment, the partner space image 41 is disposed with the distance (separation distance) corresponding to a connection degree based on the connection request levels of both a communication source and a communication destination in a three-dimensional space. Sound also changes in accordance with the distance. Here, an output example of the display 1091A and the speaker 1092 of a communication source in which separation distance gradually increases (distance D1 and distance D2 illustrated in FIG. 6) from the case where the separation distance is zero will be described with reference to FIGS. 7 to 9.

Figure 7:
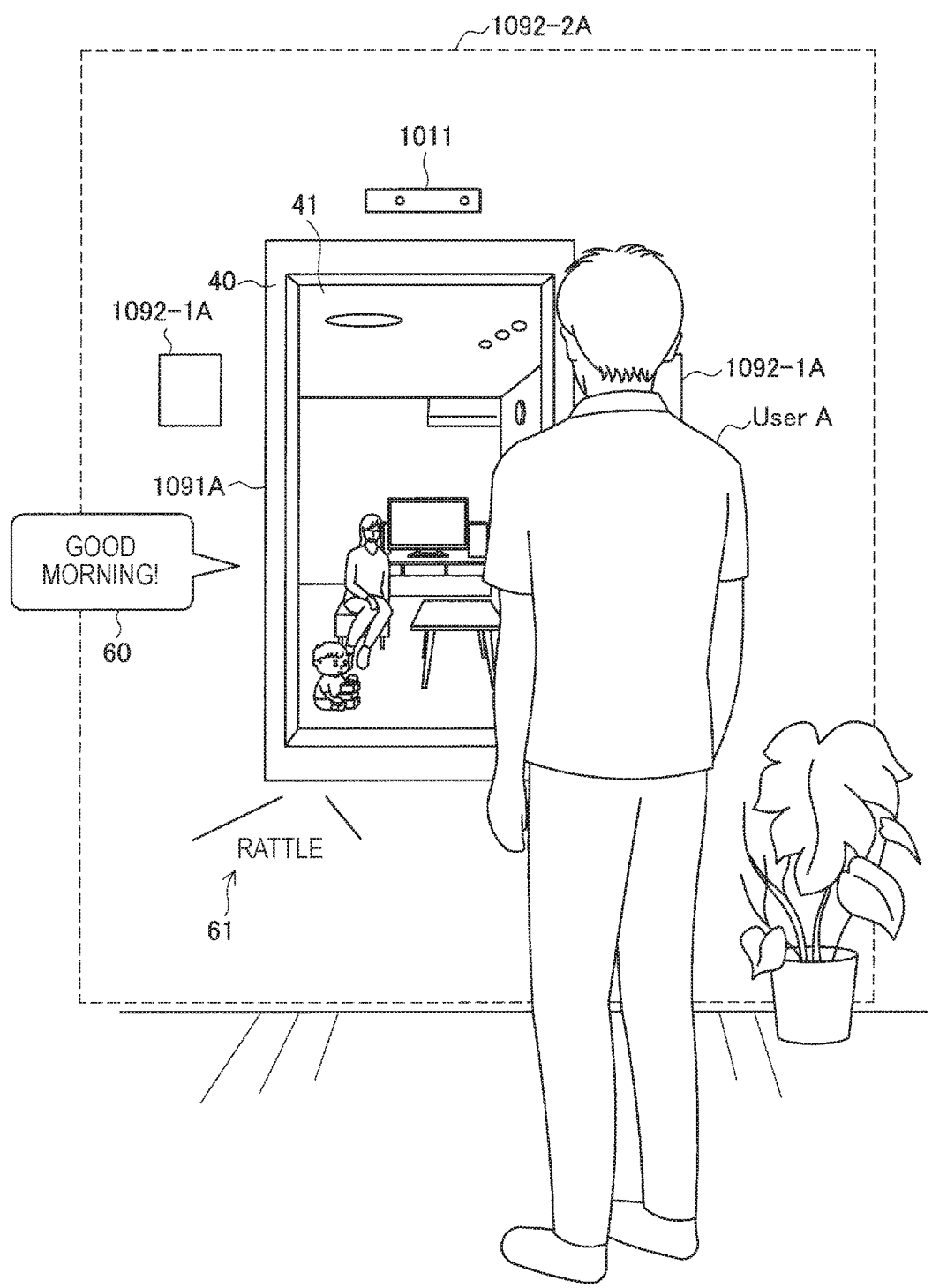
FIG. 7 is a diagram for describing a display example and audio control according to the present embodiment with a spatial distance of zero.

FIG. 7 is a diagram illustrating an output example according to the present embodiment with a spatial distance of zero. As illustrated in FIG. 7, the window frame 40 is displayed on the display 1091A installed on the wall of the space in which the user A is present. The partner space image 41 is displayed up to the inner side of the window frame 40. The partner space image 41 is, for example, a captured image of the living room in which the partner user B is present. The video is, for example, real-time video captured in the partner space. In addition, as illustrated in FIG. 7, the camera 1011 is installed around the display 1091A.

Further, as illustrated in FIG. 7, stereo speakers 1092-1A are installed on both sides of the display 1091A. In addition, a flat speaker 1092-2A is installed on the entire wall on which the display 1091A is installed. In the present embodiment, in the case of a spatial distance of zero, sound image localization and sound volume control are performed such that indoor speech 60 and indoor noise 61 in the communication destination are audible from the right front via the window frame 40 appearing in the display 1091A, and the stereo speakers 1092-1A perform reproduction.

Note that, although not illustrated, the MIC 1012 can also be installed around the display 1091A.

Figure 8:
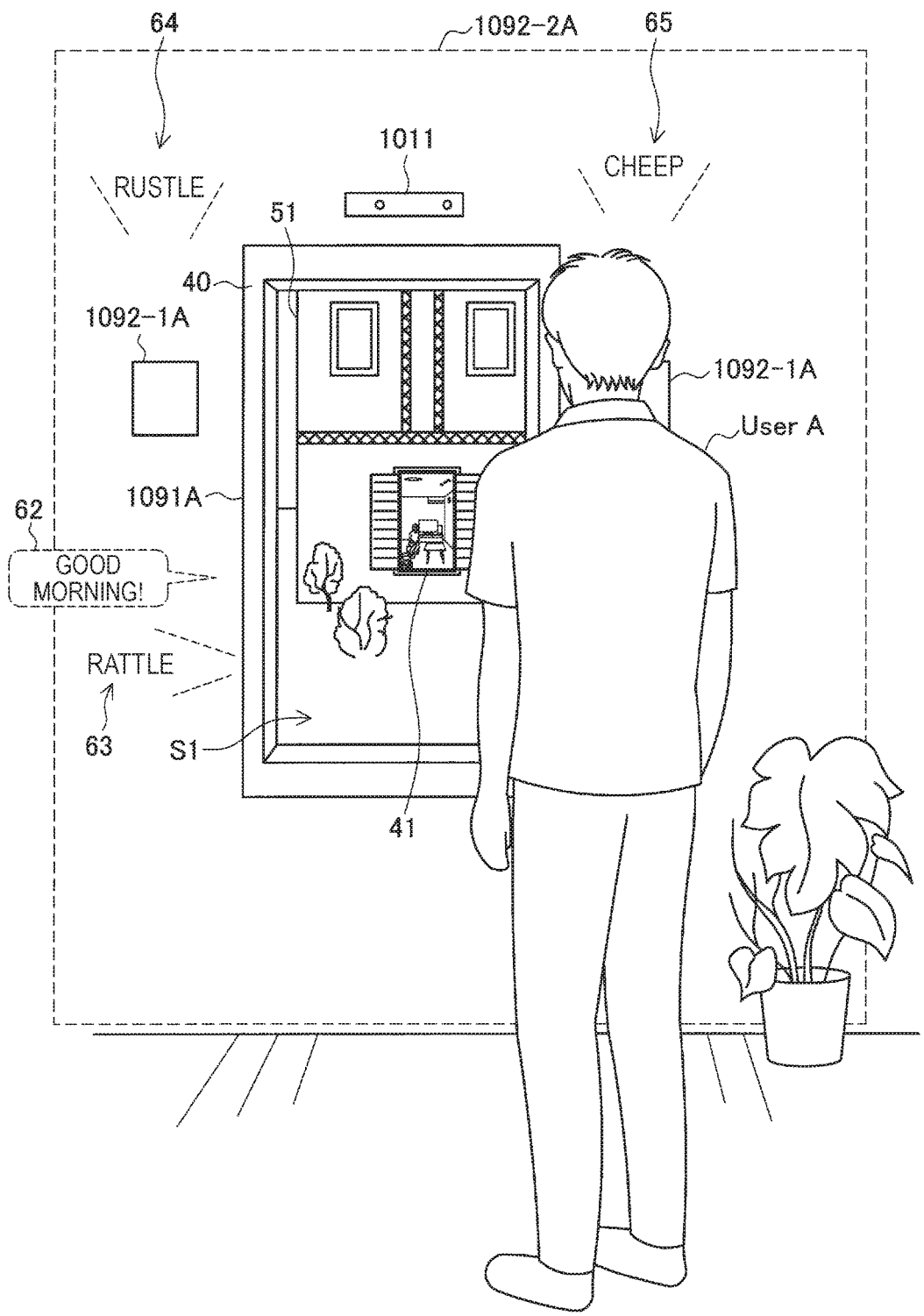
FIG. 8 is a diagram for describing a display example and audio control according to the present embodiment with spatial distance D1.

FIG. 8 is a diagram illustrating a display example according to the present embodiment with spatial distance D1. As illustrated in FIG. 8, displaying the partner space image 41 in the back apart from the window frame 40 allows a user to visually feel the distance to a partner, and offers a comfortable connection extent in some cases rather than making the user feel the presence right in front of the user. The partner space image 41 is combined, for example, with a window portion of a virtual building 51 in a three-dimensional space. In addition, a 3D courtyard space S1 is present between the user A and the partner space image 41. The user A is able to feel that the user A is connected to the partner space via the 3D courtyard space S1. The spatial distance and the 3D courtyard space are also synchronized in the partner space. The partner side display also displays the video of this side in real time with the same spatial distance, and similarly displays the 3D courtyard space in between.

In addition, in the example illustrated in FIG. 8, indoor speech 62 and indoor noise 63 in a communication destination are localized at the sound volume and the sound image positions which correspond to the distance to the partner space image 41 displayed in the back apart from the window frame 40 appearing in the display 1091A, and reproduced from the stereo speakers 1092-1A. Further, courtyard sound 64 and courtyard sound 65 corresponding to the 3D courtyard space S1 are reproduced by the flat speaker 1092-2A from the entire wall. This allows a user to aurally feel the distance to the partner, and offers a comfortable connection extent in some cases rather than making the user feel the presence right in front of the user.

Figure 9:
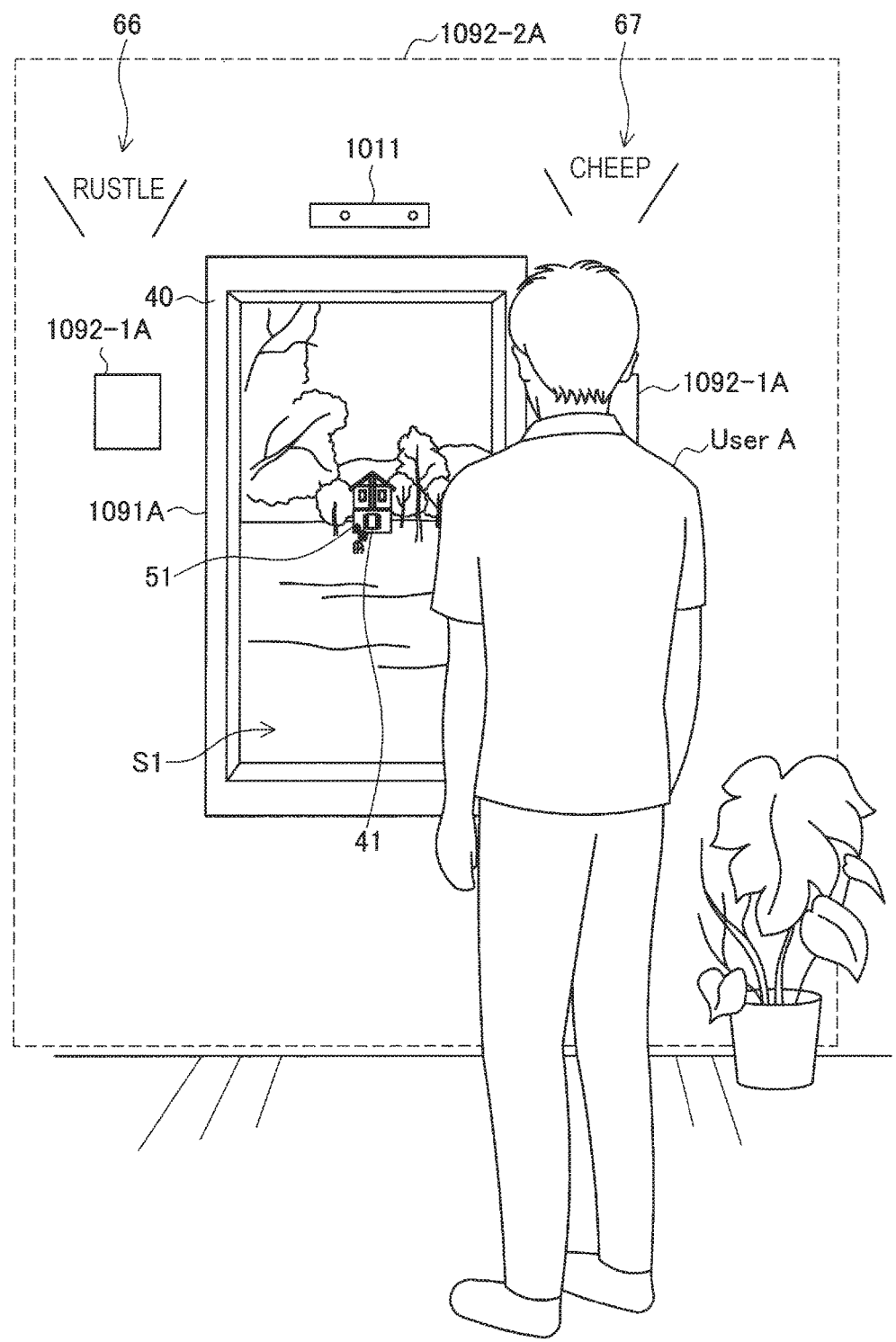
FIG. 9 is a diagram for describing a display example and audio control according to the present embodiment with spatial distance D2.

FIG. 9 is a diagram illustrating a display example according to the present embodiment with spatial distance D2. The spatial distance D2 is still longer in the depth direction than the spatial distance D1. Accordingly, as illustrated in FIG. 9, the partner space image 41 is displayed more apart from the window frame 40, and a user visually feels the distance to the partner more strongly. In addition, with respect to audio, courtyard sound 66 and courtyard sound 67 are reproduced by the flat speaker 1092-2A from the entire wall at greater sound volume than in the case illustrated in FIG. 8. Meanwhile, indoor speech or indoor noise in the partner space is not reproduced. Accordingly, a user is also able to aurally feel the distance to the partner more strongly than in the case illustrated in FIG. 8.

In FIGS. 7 to 9 described above, a scene is applied in which a user who is a communication partner lives in a log house on the opposite side in the forest. However, the present embodiment is not limited thereto. Various scenes can be applied. In addition, a scene may be selected by a communication source user or a communication destination user, or automatically decided by the system side.

4. Operation Processing

Next, operation processing according to the present embodiment will be specifically described with reference to FIGS. 10 to 13.

<4-1. Communication Control Processing>

Figure 10:
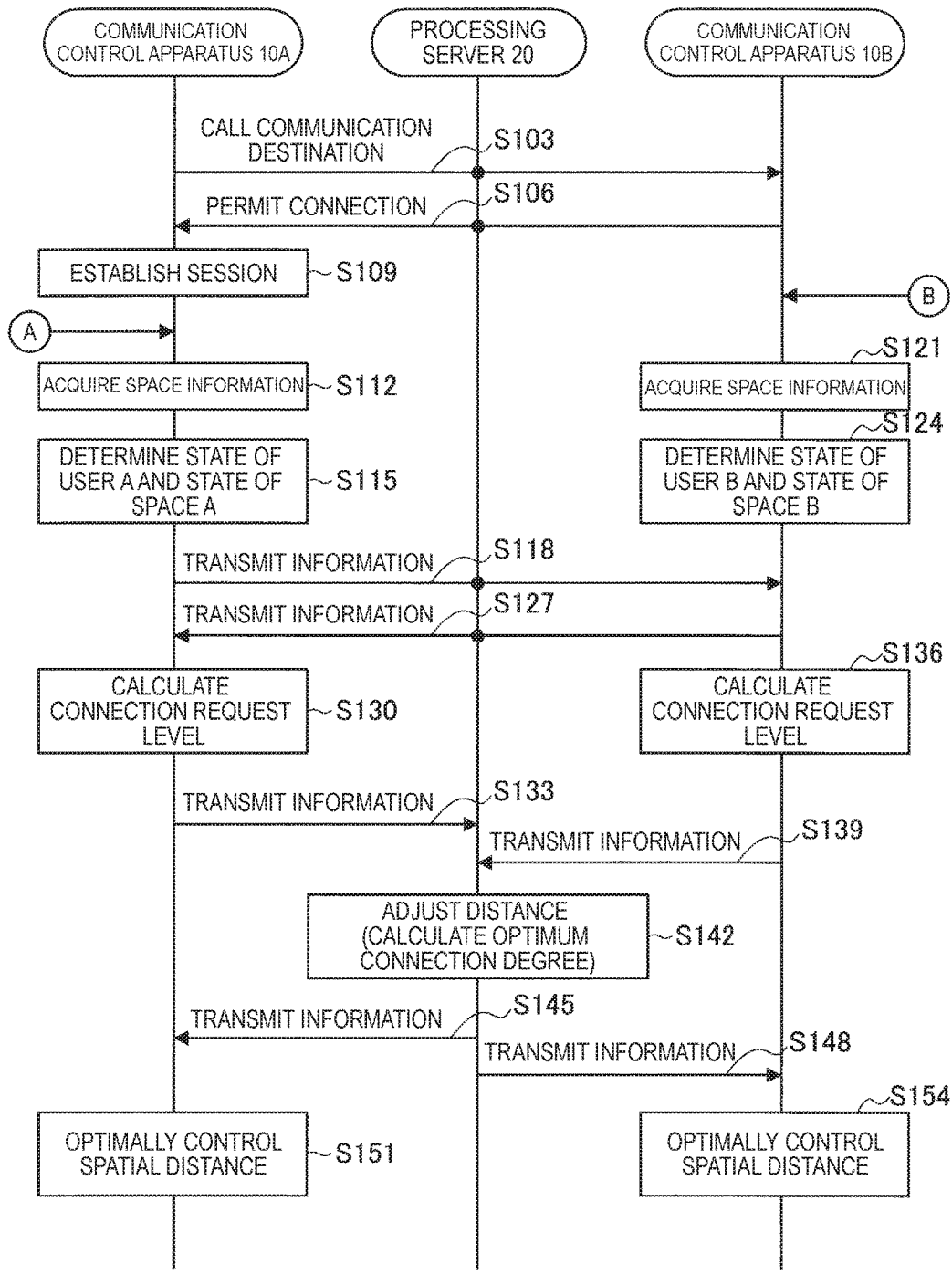
FIG. 10 is a sequence diagram illustrating communication control processing according to the present embodiment.
Figure 11:
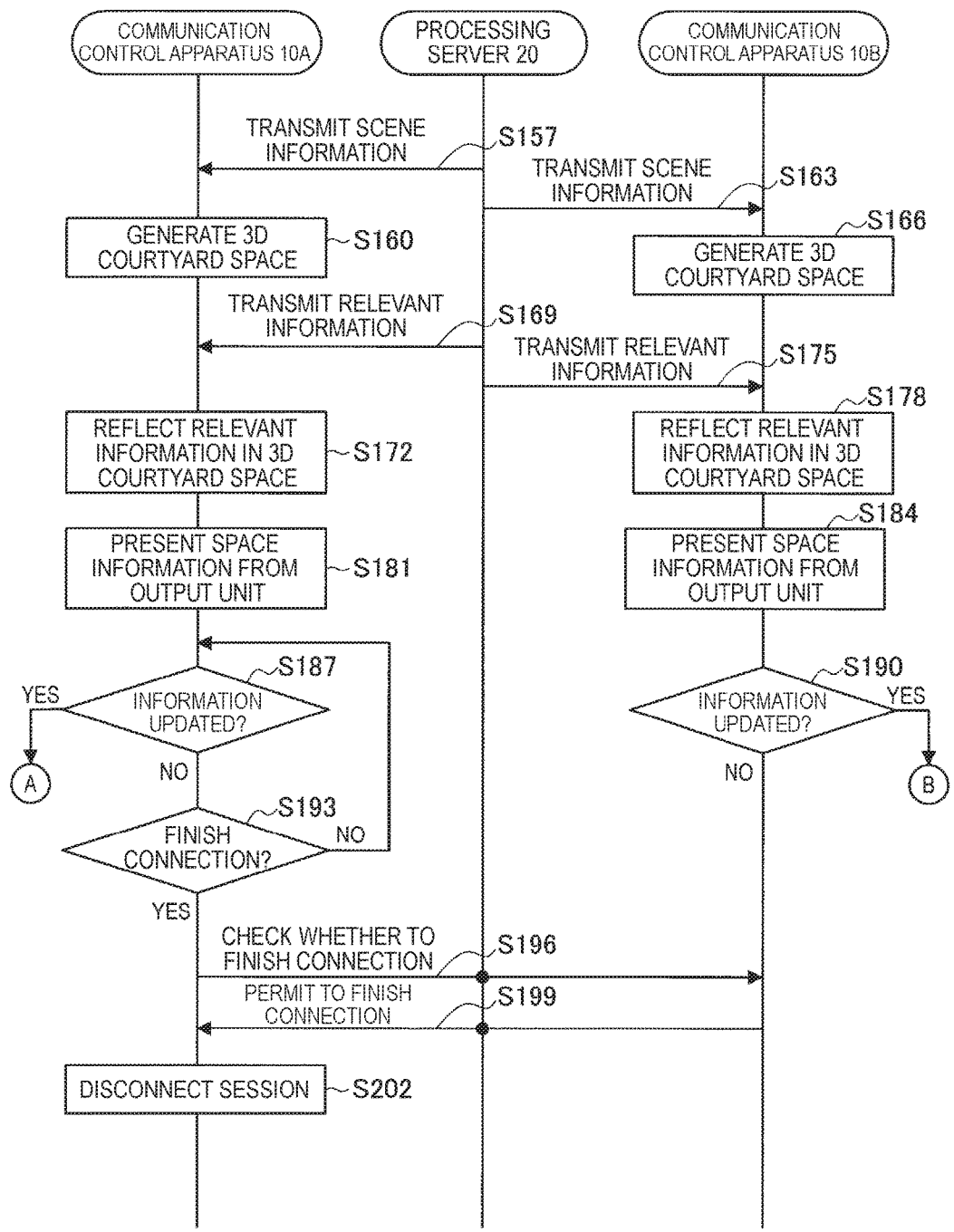
FIG. 11 is a sequence diagram illustrating the communication control processing according to the present embodiment.

FIGS. 10 and 11 are sequence diagrams each illustrating communication control processing according to the present embodiment. Here, as an example, the case will be described where the communication control apparatus 10A is a communication source (space A), the communication control apparatus 10B is a communication destination (space B), and data is transmitted and received via the processing server 30.

As illustrated in FIG. 10, first, the communication control apparatus 10A makes a call of a connection destination for the communication control apparatus 10B (step S103). Upon receiving connection permission from the communication control apparatus 10B (step S106), the communication control apparatus 10A establishes a session (step S109).

Next, the communication control apparatus 10A acquires space information through the space information processing unit 102 (step S112), and determines the state of the user A and the state of the space A through the state determination unit 103 (step S115).

Next, the communication control apparatus 10A transmits the space information and the state information from the communication unit 107 to the communication control apparatus 10B (step S118).

Meanwhile, similarly, the communication control apparatus 10B side also acquires space information (step S121) and determines the state of the user B and the state of the space B (step S124). The communication control apparatus 10B side transmits the various kinds of information to the communication control apparatus 10A (step S127).

Next, the communication control apparatus 10A calculates the connection request level of the user A through the spatial distance control unit 104 (step S130), and transmits the connection request level to the processing server 30 (step S133). The connection request level of the user A may be what is optionally input by the user A, or may be calculated on the basis of a determination result of the state of the user or the state of the space.

Next, the communication control apparatus 10B side similarly calculates the connection request level of the user B through the spatial distance control unit 104 (step S136), and transmits the connection request level to the processing server 30 (step S139).

Next, the processing server 30 adjusts the distance on the basis of the connection request level of the user A and the connection request level of the user B (step S142). That is, the processing server 30 calculates an optimum connection degree on the basis of the connection request level of the user A and the connection request level of the user B. The connection degree can be calculated with the formula 2 described above with reference to FIG. 5.

Next, the processing server 30 transmits the calculated distance to each of the communication control apparatuses 10A and 10B (steps S145 and S148).

Next, the communication control apparatuses 10A and 10B use the spatial distance control units 104 to optimally control the spatial distance (steps S151 and S154). Specifically, the spatial distance control unit 104 sets the distance transmitted from the processing server 30 as spatial distance.

Next, the processing server 30 transmits the scene information to each of the communication control apparatuses 10A and 10B (steps S157 and S163). The transmitted scene information may be information of a scene selected by the user A or the user B, or information of a scene automatically decided by the processing server 30.

Next, the communication control apparatus 10A uses, through the 3D courtyard space generation unit 106, the scene information transmitted from the processing server 30, the space information received in step S127 above, the state determination information to generate a 3D courtyard space (step S160). In addition, in the case where relevant information (weather information, illuminance of the partner space, state of cookware, schedule information of the partner user, action history, and the like) is transmitted (step S169), the 3D courtyard space generation unit 106 also reflects the relevant information in the 3D courtyard space (step S172).

Meanwhile, similarly, the communication control apparatus 10B side also generates a 3D courtyard space (step S166), and reflects the received relevant information in the 3D courtyard space (steps S175 and S178).

Next, the communication control apparatus 10A presents the 3D courtyard space generated by the space information generation unit 108, the partner space image (video of the space B), and the space information including audio information (sound and noise in the space B, and courtyard sound corresponding to the 3D courtyard space) from the output unit (display or speaker) (step S181). Meanwhile, the communication control apparatus 10B side similarly presents the 3D courtyard space, the partner space image (video of the space A), and the space information including audio information (sound and noise in the space A, and courtyard sound corresponding to the 3D courtyard space) from the output unit (display or speaker) (step S184).

The 3D courtyard space and each partner space image described above can be synchronized by the processing server 30, and displayed on each display at the same timing with the same sense of distance. In addition, the courtyard sound corresponding to the 3D courtyard space can also be reproduced by each speaker at the same timing with the same sense of distance.

Next, in the case where some information is updated (step S187/Yes), the communication control apparatus 10A repeats the processing from step S112. In addition, in the case where some information is updated (step S190/Yes), the communication control apparatus 10B also repeats the processing from step S121.

Then, once the communication control apparatus 10A is instructed to finish the connection (step S193/Yes), the communication control apparatus 10A checks with the communication control apparatus 10B whether to finish the connection (step S196). Upon receiving permission to finish the connection from the communication control apparatus 10B (step S199), the communication control apparatus 10A disconnects the session (step S202).

The above describes the communication control processing according to the present embodiment. Note that, here, as an example, synchronization processing is performed, an optimum connection degree is calculated, scene information is transmitted, and the like by the processing server 30. However, the present embodiment is not limited thereto. It is also possible for the communication control apparatus 10 to perform these kinds of processing.

<4-2. Sound Source Separation Processing>

Figure 12:
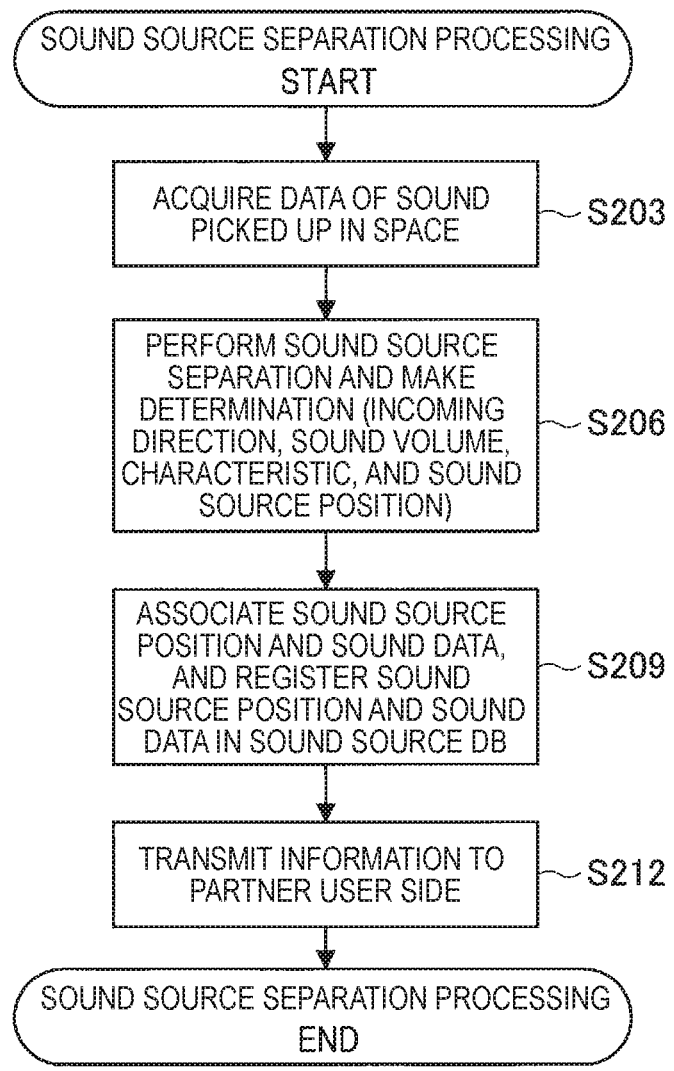
FIG. 12 is a flowchart illustrating sound source separation processing according to the present embodiment.

Next, sound source separation processing for the sound picked up by the MIC 1012 will be described with reference to FIG. 12. FIG. 12 is a diagram illustrating a flowchart of sound source separation processing according to the present embodiment.

As illustrated in FIG. 12, first, the space information processing unit 102 of the communication control apparatus 10 acquires data of sound picked up in a space (step S203), and performs sound source separation and makes a determination (step S206). Specifically, the space information processing unit 102 determines the incoming direction, sound volume, characteristics, and sound source position of the sound data subjected to the sound source separation. At this time, the space information processing unit 102 can refer to the sound source determination DB 112.

Next, the space information processing unit 102 associates the sound source position with the sound data, and registers the sound source position and the sound data in the sound DB 113 (step S206). The sound DB 113 may be shared with a communication partner.

Next, the space information processing unit 102 transmits the sound data subjected to the sound source separation along with a determination result to the partner user side (communication destination) via the communication unit 107 (step S212).

<4-3. Sound Source Reproduction Processing>

Figure 13:
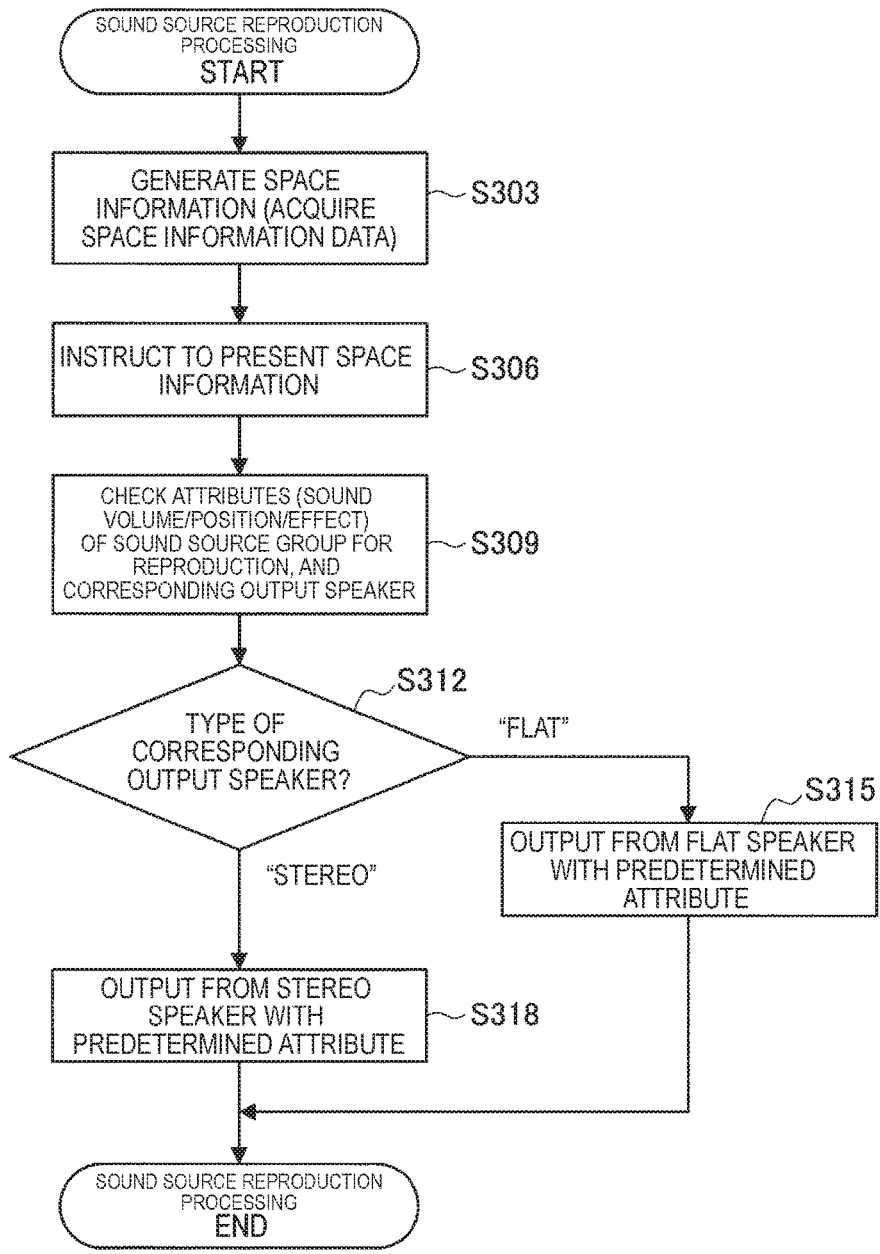
FIG. 13 is a flowchart illustrating sound source reproduction processing according to the present embodiment.

Next, sound source reproduction processing performed by the speaker 1092 will be described with reference to FIG. 13. FIG. 13 is a diagram illustrating a flowchart of sound source reproduction processing according to the present embodiment.

As illustrated in FIG. 13, first, the space information generation unit 108 of the communication control apparatus 10 generates space information (step S303). Space information is generated on the basis of space information received from a communication destination, and sound data associated with an event in a communication destination space which is extracted from the sound DB 113 shared with a communication destination user.

Next, the space information generation unit 108 instructs the output unit 109 to present the space information (step S306).

Next, the output unit 109 checks the attributes (sound volume, sound source position, effects (such as the presence or absence of directionality)) of a sound source group for reproduction and the corresponding speaker (step S309).

Next, in the case where the type of the corresponding speaker is stereo (step S312/stereo), the output unit 109 outputs the sound data with a predetermined attribute corresponding to the stereo speaker (step S318). Meanwhile, in the case where the type of the corresponding speaker is flat (step S312/flat), the output unit 109 outputs the sound data with a predetermined attribute corresponding to the flat speaker (step S315).

5. Conclusion

As described above, in an information processing system according to an embodiment of the present disclosure, it is possible to aurally produce distance in a virtual three-dimensional space by using the space for a connection to a communication partner, and realize more comfortable communication.

In addition, a display installed in the space of a communication source is regarded as a window (or a door), and a space image in which the video of the space of a communication partner is disposed is displayed in a place having predetermined distance in a three-dimensional space, thereby making it possible to visually express the distance to the communication partner. Note that the aspect ratio of the display installed on the wall may be implemented in accordance with the dimensions of an actual window or door. In addition, in the case where a display is regarded as a door, the display is disposed such that the lower side of the display is positioned near the floor, thereby making possible to express the presence of the space over the door more realistically.

In addition, control may be performed such that the aspect ratio of the display area of the video of the space of a communication partner which is disposed in a three-dimensional space is the same as the aspect ratio of the display.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is also possible to create a computer program for causing the above-described communication control apparatus 10, or the hardware such as a central processing unit (CPU), a read only memory (ROM), and a random access memory (RAM) built in the processing server 30 to execute the functions of the communication control apparatus 10 or the processing server 30. In addition, there is also provided a computer-readable storage medium having the computer program stored therein.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:
a reception unit configured to receive data from a communication destination; and
a reproduction control unit configured to perform control such that sound data of a space of the communication destination is reproduced from a sound output unit in a space of a communication source with an output value in accordance with separation distance between the communication destination and the communication source disposed in a virtual three-dimensional space, the output value being different for each sound source type.

(2)

The information processing apparatus according to (1), further including:
a distance control unit configured to control virtual separation distance between the communication source and the communication destination in the three-dimensional space,
in which
the distance control unit controls the separation distance in accordance with a connection degree adjusted on a basis of a connection request level from the communication source and a connection request level from the communication destination.

(3)

The information processing apparatus according to (2), in which
the connection request level is calculated in accordance with a context of a user, the context being determined on a basis of space information.

(4)

The information processing apparatus according to any one of (1) to (3), in which
the sound data of the space of the communication destination is sound data received by the reception unit from the communication destination, or sound data extracted from a predetermined database on a basis of the data received by the reception unit from the communication destination.

(5)

The information processing apparatus according to any one of (1) to (4), in which
the reproduction control unit performs control such that uttered sound data and object sound data of the space of the communication destination increase and environment sound in the space of the communication destination decreases as the space of the communication destination is closer to the space of the communication source disposed in the three-dimensional space, and performs control such that the uttered sound data and the object sound data decrease and the environment sound increases as the space of the communication destination is more distant from the space of the communication source disposed in the three-dimensional space.

(6)

The information processing apparatus according to (5), in which
the reproduction control unit performs sound image localization control such that the uttered sound data and the object sound data of the sound data are reproduced at corresponding sound image positions, and performs control such that the environment sound is reproduced from a whole of a reference plane of the space of the communication source.

(7)

The information processing apparatus according to any one of (1) to (6), further including:
a sound source separation unit configured to perform sound source separation for sound data acquired from the space of the communication source; and
a transmission unit configured to transmit data including the sound data subjected to the sound source separation to the communication destination, the data being acquired from the space of the communication source.

(8)

The information processing apparatus according to any one of (1) to (7), further including:
a generation unit configured to generate space image information in which an image corresponding to the space of the communication destination is disposed at a predetermined position corresponding to the separation distance in the three-dimensional space; and
a display control unit configured to perform control such that the generated space image information is displayed on a display unit in the space of the communication source.

(9)

An information processing method including, by a processor:
receiving data from a communication destination; and
performing control such that sound data of a space of the communication destination is reproduced from a sound output unit in a space of a communication source with an output value in accordance with separation distance between the communication destination and the communication source disposed in a virtual three-dimensional space, the output value being different for each sound source type.

(10)

A program for causing a computer to function as:
a reception unit configured to receive data from a communication destination; and
a reproduction control unit configured to perform control such that sound data of a space of the communication destination is reproduced from a sound output unit in a space of a communication source with an output value in accordance with separation distance between the communication destination and the communication source disposed in a virtual three-dimensional space, the output value being different for each sound source type.

REFERENCE SIGNS LIST 1 telepresence system
10 (10A to 10C) communication control apparatus
20 network
30 processing server
40 window frame
41 partner space image
100 communication control apparatus
101 input unit
1011 camera
1012 MIC
1013 sensor
102 space information processing unit
103 state determination unit
104 spatial distance control unit
105 operation I/F
106 courtyard space generation unit
107 communication unit
108 space information generation unit
109 output unit
1091 display
1092 speaker
1093 indicator
110 storage unit
111 transmission information generation unit
112 sound source determination DB
113 sound DB 113

The invention claimed is:

1. An information processing apparatus comprising:
a reception unit configured to receive space data from a communication destination; and
a reproduction control unit configured to perform control such that sound data of a space of the communication destination is reproduced from a sound output unit in a space of a communication source with an output value in accordance with a separation distance between the communication destination and the communication source disposed in a virtual three-dimensional space, the output value being different for each sound source type.

2. The information processing apparatus according to claim 1, further comprising:
a distance control unit configured to control virtual separation distance between the communication source and the communication destination in the three-dimensional space, wherein
the distance control unit controls the separation distance in accordance with a connection degree adjusted on a basis of a connection request level from the communication source and a connection request level from the communication destination.

3. The information processing apparatus according to claim 2, wherein
the connection request level is calculated in accordance with a context of a user, the context being determined on a basis of space information.

4. The information processing apparatus according to claim 1, wherein
the sound data of the space of the communication destination is sound data received by the reception unit from the communication destination, or sound data extracted from a predetermined database on a basis of the data received by the reception unit from the communication destination.

5. The information processing apparatus according to claim 1, wherein
the reproduction control unit performs control such that uttered sound data and object sound data of the space of the communication destination increase and environment sound in the space of the communication destination decreases as the space of the communication destination is closer to the space of the communication source disposed in the three-dimensional space, and performs control such that the uttered sound data and the object sound data decrease and the environment sound increases as the space of the communication destination is more distant from the space of the communication source disposed in the three-dimensional space.

6. The information processing apparatus according to claim 5, wherein
the reproduction control unit performs sound image localization control such that the uttered sound data and the object sound data of the sound data are reproduced at corresponding sound image positions, and performs control such that the environment sound is reproduced from a whole of a reference plane of the space of the communication source.

7. The information processing apparatus according to claim 1, further comprising:
a sound source separation unit configured to perform sound source separation for sound data acquired from the space of the communication source; and
a transmission unit configured to transmit data including the sound data subjected to the sound source separation to the communication destination, the data being acquired from the space of the communication source.

8. The information processing apparatus according to claim 1, further comprising:
- a generation unit configured to generate space image information in which an image corresponding to the space of the communication destination is disposed at a predetermined position corresponding to the separation distance in the three-dimensional space; and
- a display control unit configured to perform control such that the generated space image information is displayed on a display unit in the space of the communication source.

9. An information processing method performed by a processor, the method comprising:
- receiving space data from a communication destination; and
- performing control such that sound data of a space of the communication destination is reproduced from a sound output unit in a space of a communication source with an output value in accordance with a separation distance between the communication destination and the communication source disposed in a virtual three-dimensional space, the output value being different for each sound source type.

10. A non-transitory computer readable medium storing instructions that when executed by a processor cause the processor:
- receive space data from a communication destination; and
- perform control such that sound data of a space of the communication destination is reproduced from a sound output unit in a space of a communication source with an output value in accordance with a separation distance between the communication destination and the communication source disposed in a virtual three-dimensional space, the output value being different for each sound source type.

* * * * *